United States Patent [19]

Tanaka et al.

[11] Patent Number: 4,694,354
[45] Date of Patent: Sep. 15, 1987

[54] METHOD AND APPARATUS FOR PRINTING TRIMMING INSTRUCTIONS FOR DEVELOPER OF PHOTOGRAPHS

[75] Inventors: Hiroshi Tanaka, Tokyo; Shinsuke Fukehara, Kanagawa, both of Japan

[73] Assignee: Sony Corporation, Tokyo, Japan

[21] Appl. No.: 841,610

[22] Filed: Mar. 20, 1986

[30] Foreign Application Priority Data

Mar. 29, 1985 [JP] Japan .................................. 60-65881

[51] Int. Cl.⁴ ......................... H04N 1/21; H04N 7/18; G03F 3/10; G01D 9/00
[52] U.S. Cl. ..................................... 358/296; 358/76; 358/102; 346/33 R; 355/40
[58] Field of Search ................... 358/296, 302, 75, 76, 358/102; 355/40, 55; 346/153.1, 33 R

[56] References Cited

U.S. PATENT DOCUMENTS 4,496,983  1/1985  Takenaka ........................ 358/76 X
4,603,966  8/1986  Brownstein ..................... 358/102 X

FOREIGN PATENT DOCUMENTS

0042680 12/1981 European Pat. Off. .
945432 12/1963 United Kingdom .
1122048  7/1968 United Kingdom .
1374085 11/1971 United Kingdom .
1342562  3/1972 United Kingdom .
2143065  1/1985 United Kingdom .
2141901  1/1985 United Kingdom .

Primary Examiner—E. A. Goldberg
Assistant Examiner—Linda M. Peco
Attorney, Agent, or Firm—Vorys, Sater, Seymour & Pease

[57] ABSTRACT

An apparatus for printing trimming instructions, includes a first means deriving a video signal representative of a photograph image on negative or positive film, a display unit which reproduces a positive video image on a display monitor screen, a second means for accepting trimming data input including data defining the size and shape of a trimming frame on the display monitor screen and data defining the position of the trimming frame on the reproduced video image, third means for storing video signal data and trimming data, and a printer for printing a positive image including the trimming frame.

14 Claims, 9 Drawing Figures

METHOD AND APPARATUS FOR PRINTING TRIMMING INSTRUCTIONS FOR DEVELOPER OF PHOTOGRAPHS

BACKGROUND OF THE IVENTION

The present invention relates generally to a novel and useful method and apparatus for giving trimming instructions to a developer of photographs. More specifically, the invention relates to a method and apparatus for printing a photograph with a frame defining or representing trimming instructions for a developer.

Well-known, conventional ways of telling a developer how to trim a photograph include manually drawing a box or frame on the envelope for the negatives or drawing a box on a sketch of the image. In the former procedure, it is usually difficult to specify the exact location of the trimming frame. In the latter process, it is rather troublesome depict the picture image by hand with sufficient detail.

On the other hand, the developer must often contend with indefinite instructions from the customer. This often leads to some offset between a trimming frame desired by the customer and that actually produced. This is especially in the former case which is more popular than the latter.

SUMMARY OF THE INVENTION

Therefore, it is an object of the present invention to provide a novel and useful method and apparatus for providing trimming instructions for a developer.

Another object of the invention is to provide a method and apparatus for producing a print derived from negative film or positive film used in developing a photograph, which print includes a printed trimming frame.

A further object of the invention is to provide an apparatus for printing trimming instructions including a trimming frame, which apparatus includes a video monitor displaying a photograph to be developes and a movable trimming frame.

A further object of the present invention is to provide an apparatus for printing trimming instructions, which can also print necessary instructions for development, such as print size, margin, and frame number in the original roll of film and so forth.

In order to accomplish the aforementioned and other objects, a method for printing trimming instructions for a developer, according to the present invention, comprises the step of displaying the complete picture to be trimmed on a display monitor screen. The picture displaying step is followed by a step of superimposing a trimming frame on the displayed picture at a desired position and then fixing the desired trimming frame. A printing means is then activated to produce a positive print with the trimming frame drawn around the desired part of the picture to be trimmed.

In the preferred process, text instructions such as print size, the presence or absence of a white margin, and so forth may be additionally entered. Such additional data may also be printed on the positive print.

According to one aspect of the invention, a process for printing trimming instructions for use in trimming and development of a photograph, comprises the steps of:
picking up an image of a base photofilm;
generating a video signal indicative of the picked up image;
reproducing the video signal on a display screen;
drawing a frame delimiting an area of the reproduced image to be trimmed; and
printing a copy of the reproduced image and the frame for reference during trimming and development of the base photofilm.

The process further comprises a step for selecting the size and shape of the frame. Also, the process may further comprise a step of selecting the type of frame from between a box and a mask.

Furthermore, the preferred process further comprises a step of inputting additional alphanumeric characters providing additional instructions and information necessary for trimming, and a step of superimposing the additional alphanumeric characters on the reproduced image on the display screen. The step of selecting the size and shape of the frame includes selection of the horizontal/vertical aspect ratio from among a plurality of known standard values.

To implement the aforementioned process, an apparatus for printing trimming instructions, according to the invention, includes a first means deriving a video signal representative of a photograph image on negative or positive film, a display unit which reproduces a positive video image on a display monitor screen, a second means for accepting trimming data input including data defining the size and shape of a trimming frame on the display monitor screen and data defining the position of the trimming frame on the reproduced video image, third means for storing video signal data and trimming data, and a printer for printing a positive image including the trimming frame.

According to another aspect of the invention, an apparatus for printing trimming instructions for use in trimming a photograph, comprises first means for picking up images from photofilm and generating a video signal based thereon, second means for displaying a video image on a display screen, which video image corresponds to the image on the photofilm, third means for drawing a frame delimiting a section of the image to be trimmed on the display screen, and fourth means for printing a copy of the image on the display screen.

Preferably, the third means allows adjustment of the size and shape of the frame. Also, it is preferable that the third means includes a manual operation unit allowing manual selection of the size and shape of the frame. The manual operation unit may include a plurality of selector switches for selecting the shape of the frame from among a plurality of known standard horizontal/vertical proportions. The manual operation unit allows input of alphanumeric characters providing additional instructions for trimming in addition to the frame.

Furthermore, the first means performs negative/positive reversal of the image on the display screen. The first means may further include a zoom mechanism for adjusting the size of the video image reproduced on the display screen.

According to a further aspect of the invention, an apparatus for printing trimming instructions for use in developing and trimming photographs, comprises means for displaying the image recorded in a photograph, means allowing manual specification of a trimming frame and for superimposing an image of the trimming frame on the displayed image to form a trimming instruction image, and means for reproducing the trimming instruction image in a form suitable for transfer to a photographic developer.

As set forth above, according to the present invention, trimming instructions are given in the form of a hard copy of the photograph to be trimmed. Therefore, accurate development is expedited by reference to the definite trimming instructions on the hard copy.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings.

DESCRIPTION OF THE PREFERRED EMBODIMENTS

Figure 1:
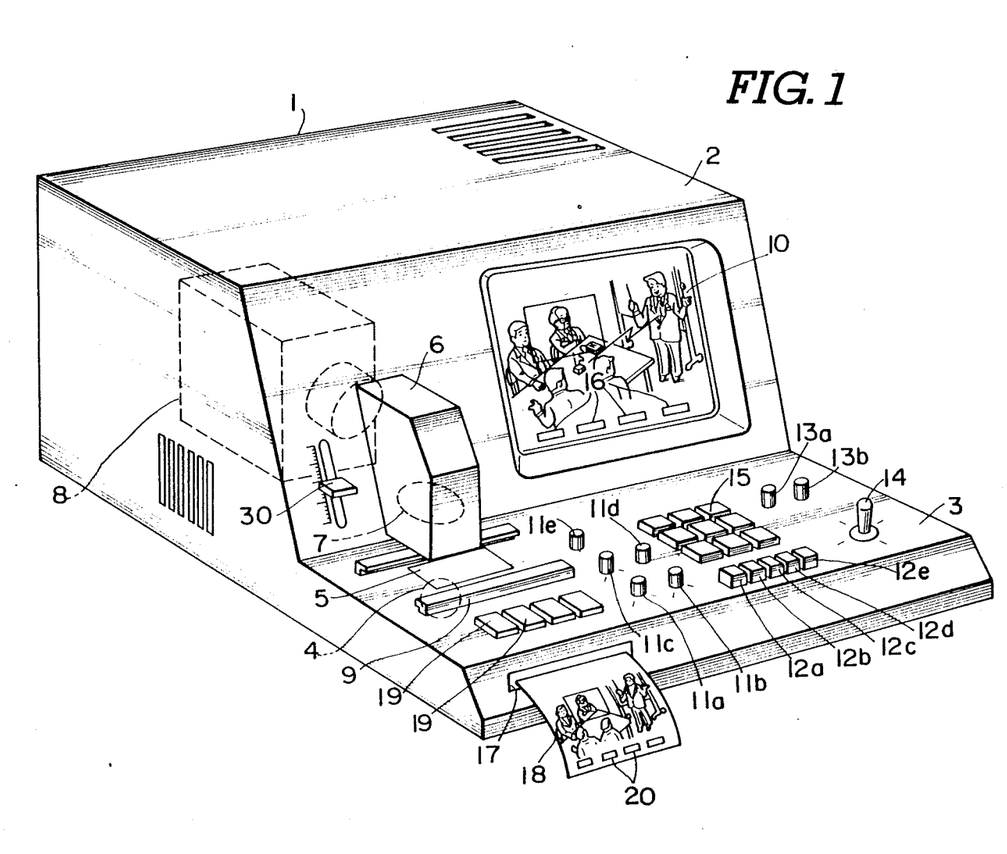
FIG. 1 is a perspective view of the preferred embodiment of an apparatus for printing trimming instructions for a developer according to the present invention.

Referring now to the drawings, particularly to FIG. 1, the preferred embodiment of a trimming instructions printing apparatus according to the present invention has a housing 1. The housing 1 is made up of a main body section 2 and an operating section 3. A transparent window 5 is formed in the operating section 3. A light source 4, such as a lamp, is received within the operating section 3 and arranged opposite to the transparent window 5. The light source 4 shines light upward through the transparent window 5. An optical lens 7 is received within a hollow lens mount 6 secured to the front vertical face of the main body section 2. The lens 7 opposes the light source 4 to receive the light beam emitted by the light source through the transparent window 5. The lens mount 6 defines a path for the received light. One end of the received light path opposes a camera head 8. As can be seen in FIG. 1, the received light path defined within the lens mount 6 includes an approximately right-angle turn so as to deflect the light toward the optical axis of the camera head 8.

The lens 7 is associated with a zoom mechanism 7a (shown schematically in FIG. 2) for controlling video image size in a per se well-known manner. The zoom mechanism 7a cooperates with a manual zoom control lever 30 mounted on the front face of the main body section 2 of the housing 1. The zoom mechanism is constructed in a well known manner.

The camera head 8 may comprise a color video recording camera of known construction. However, it is not essential to use a color video recording camera for the camera head 8. It is possible to employ any other optical image pick-up means capable of forming a video signal.

A pair of film guides 9 bracket the transparent window 5. The film guides 9 are designed to guide a negative or positive photofilm, such as 35 mm photographic film and the like, across the transparent window 5. The image on the photofilm is thus picked up by the camera head 8.

The main body section 2 contains a video monitor 10 for reproducing approximately one photofilm frame from the photofilm as a positive image. A trimming frame can be superimposed on the reproduced image on the display monitor 10 under the control of a manual input unit in the operating section. The trimming instructions entered through the input unit can specify either masking for the parts of the image not be developed or a trimming box surrounding the section to be trimmed. The trimming mask or box on the display monitor 10 can be shifted manually through the input unit to the desired section of the image. The input unit also allows entry of other trimming data, such as the print size, margin instructions, surfacing, i.e. glossy or matte, the frame number on the roll and so forth.

Figure 3:
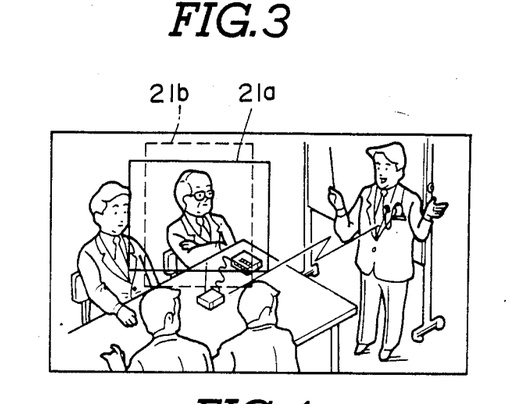
FIGS. 3 to 8 are explanatory illustrations of various forms of trimming instructions printed by the trimming instructions printing apparatus of FIG. 1.
Figure 4:
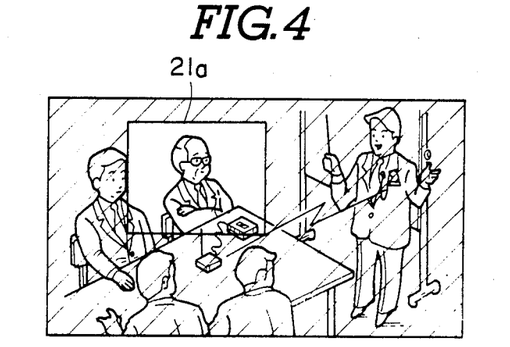
Figure 5:
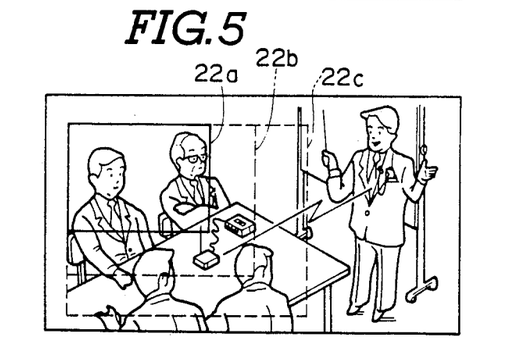

In the shown embodiment, the input unit includes fine rotary selector members 11a, 11b, 11c, 11d and 11e. The rotary selector member 11a controls the orientation of the axis of the rectangular trimming frame 21a and 21b (shown in FIG. 3) on the display monitor 10. Accordingly, the rotary selector member 11a is movable between a first position specifying a horizontally aligned trimming frame 21a and a second position specifying the vertical form of the trimming frame 21b. The rotary selector member 11b selects either the trimming mask, which is shown in hatching in FIG. 4, or the trimming box, such as is shown at 21a and 21b. The rotary selector member 11c selects positive or negative video image reproduction on the display monitor 10. The rotary selector element 11d selects the size of the trimming mask or box corresponding to its angular position. Therefore, the size of the trimming mask or box frame 22a, 22b and 22c can be enlarged or contracted by rotating the rotary selector member 11d, as shown in FIG. 5. The aspect ration the trimming frame 22a, 22b, 22c is independent of its size. Also, the angular position of the rotary selector member 11d controls only the size of the trimming frame, not that of the reproduced video image.

The input unit also includes fine push button selector members 12a, 12b, 12c, 12d and 12e. Each of the push button selector members 12a, 12b, 12c, 12d and 12e corresponds to a standard print size. For instance, the member 12a corresponds to cabinet size, the member 12b corresponds to one-eighth size, the member 12c corresponds to one-sixth size, the member 12d corresponds to one-fourth size and the member 12e corresponds to free size. Depressing one of the push button selector members 12a, 12b, 12c, 12d and 12e causes a trimming frame of dimensions matching the designated finished photo-print size to be superimposed on the reproduced video image on the display monitor 10. The desired size of the trimming frame can then be set by selecting the angular position of the rotary selector member 11d.

Figure 7:
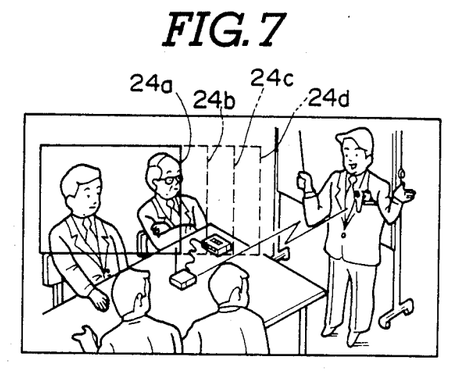
Figure 8:
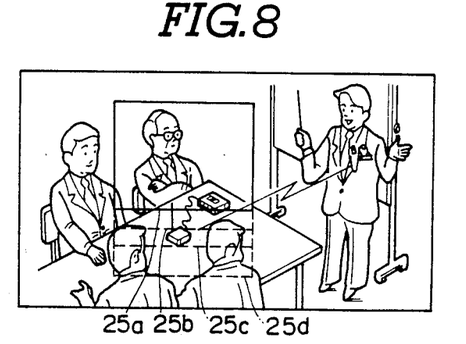

The push button selector member 12e can be depressed to allow selection of an aspect ratio other than the standard. In this case, a rotary selector member 13a becomes active to allow selection of the width of the frame horizontally, as illustrated by the reference numerals 24a, 24b, 24c and 24d in FIG. 7. Similarly, the rotary selector member 13b also becomes active to allow selection of the vertical height of the photo-print, as illustrated by the reference numerals 25a, 25b, 25c and 25d in FIG. 8.

Figure 6:
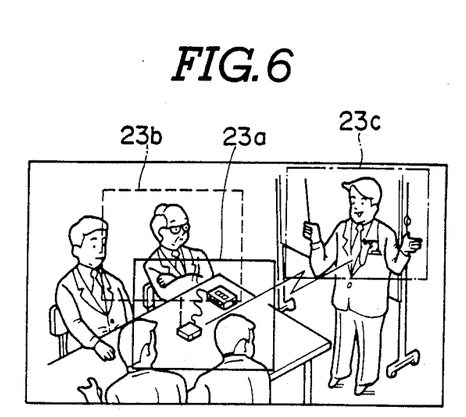

The input unit also has a joystick 14 for moving the trimming frame about the display monitor 10, as shown by reference numerals 23a, 23b and 23c in FIG. 6. Therefore, by utilizing the joystick 14, the trimming frame can be moved to the desired position.

Furthermore, the input unit includes a ten-key array 15 for entering numerical trimming data. The ten-key pad allows entry of the frame number of the photoimage to be trimmed, the date and so forth. The trimming data may include code inputs for selecting glossy or matte finish, for selecting the presence or absence of a white margin and so forth. Such trimming data input through the ten-key pad 15 may also be displayed in captions 16 on the display monitor 10. These captioned trimming instructions may be left blank even when the trimming mask is selected through the rotary selector member 11b.

A print-eject mouth 17 is formed in the front edge of the operating section 3. The print-eject mouth 17 ejects a printed copy 18 of the video image on the display monitor 10. As will be seen from FIG. 1, the printed copy 18 also includes the trimming instruction captions 20 corresponding to the captions 16 on the display monitor 10. For this purpose, a printer 38 (in FIG. 2) is accommodated within the housing 1. The printer 38 may comprise a thermal printer or the like. The printer 38 is associated with operation buttons 19 for the printer arranged on the input unit. For printing the reproduced image with the trimming frame and the trimming instructions as displayed on the display monitor 10, the apparatus may include a one-field or one-frame memory for storing video data corresponding to the displayed image.

Figure 2:
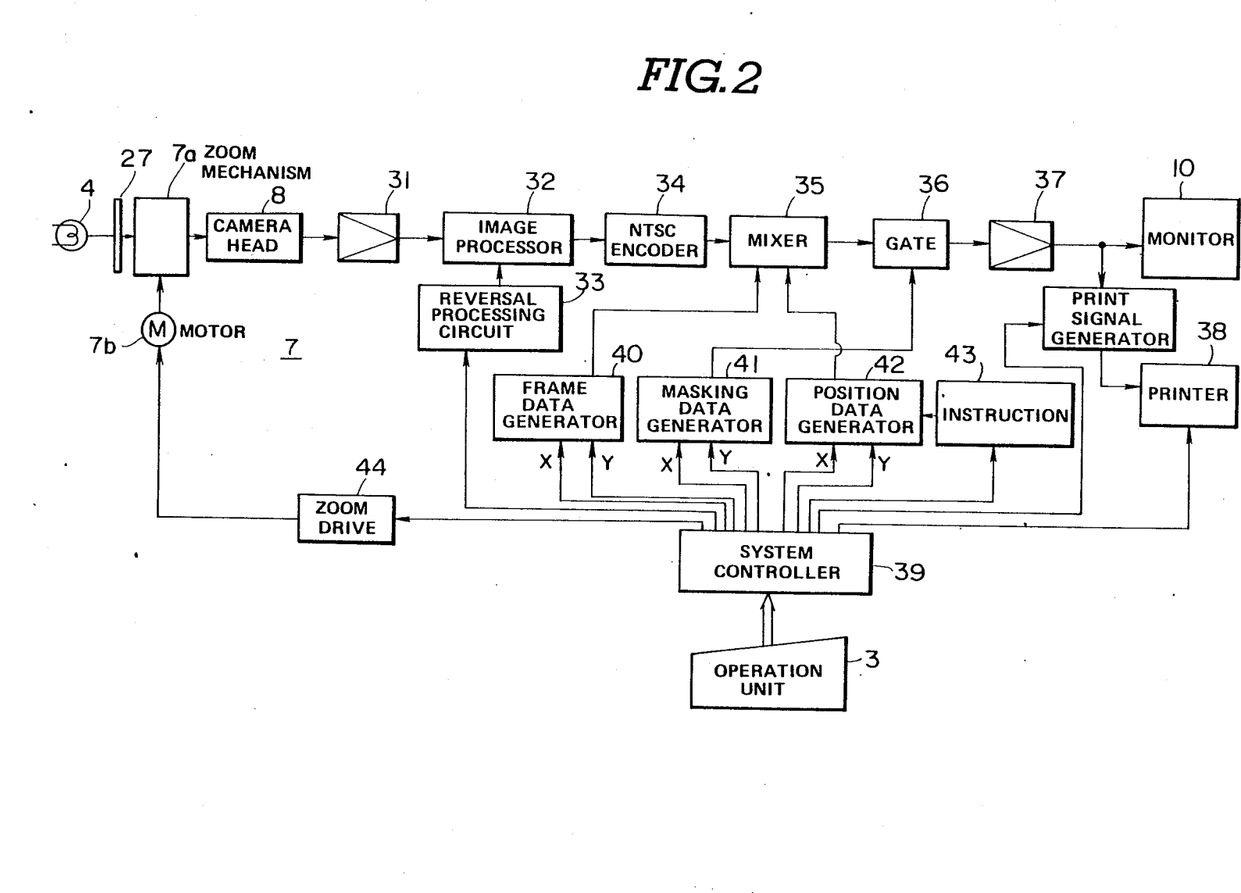
FIG. 2 is a block diagram of the trimming instructions printing apparatus in FIG. 1.

FIG. 2 is a block diagram of the circuitry and information flow of the apparatus of FIG. 1. As can be seen in FIG. 2, the video image on a photofilm 27 is received by the camera head 8 through the lens 7 associated with the zoom mechanism 7a. The zoom mechanism 7a is associated with a zoom servo-motor 7b controlled by the manual zoom control lever 30 of FIG. 1. The zoom servo-motor 7b drives the zoom mechanism to move the lens 7 for expansion and reduction of the video image received by the camera head 8.

The camera head 8 generates a video signal representative of the received video image by a per se well-known process. The video signal from the camera head is supplied to an image processor 32 through an amplifier 31. The image processor 32 performs per se well-known video signal processing, such as gamma correction, white-balance correction, negative/positive reversal, W-chip, D-chip and so forth. The processed video signal from the image processor 32 is then fed to an encoder 34, such as an NTSC system encoder. The encoder 34 derives a composite signal, such as NTSC format composite signal based on the processed video signal from the image processor 32. The composite signal derived by the encoder 34 is fed to a mixer 35. The mixer 35 is adapted to receive trimming instructions indicative signals which will be described later for mixing the trimming instruction indicative signals with the composite signal from the encoder 34 and outputs a mixer output. The mixer output is fed through a gate 36 and a main video signal amplifier 37 to the display monitor 10 which reproduces a video image corresponding to the image on the photofilm and superimposed with the trimming instructions and frame.

Preferably, the display monitor 10 is a color monitor. Color display monitors can of course also reproduce monochrome video images in case of black-and-white photofilm.

A trimming instruction indicative signal generator circuit supplies trimming instruction indicative signals to the mixer and controls the gate 36. As shown in FIG. 2, the trimming instructions indicative signal generator comprises a box data generator 40, a masking data generator 41, a position data generator 42 and an instruction data signal generator 43. Each of the circuits making up the trimming instruction indicative signal generator is connected for input from a system controller 39 which is, in turn, connected to the input unit in the operating section 3. In addition, the system controller 39 is connected for output to a reversal processing circuit 33 for controlling negative/positive reversal of the video image reproduced on the display monitor 10. The system controller 39 thus controls the aforementioned box data generator 40, masking data generator 41, position data generator 42, instruction data signal generator 43 and the reversal processing circuit 33 based on input signals from the input unit in the following manner.

The box data generator 40 becomes active when the rotary selector member 11b is operated to select the trimming box rather than the trimming mask. When active, the box data generator 40 is responsive to a trimming box control signal from the system controller derived on the basis of signals from the frame configuration push-button selector members 12a to 12e and from the rotary selector members 11a, 13a and 13b. Based on the input signals from the associated push button members and the rotary selector members, the box data generator 40 produces a box data indicative signal to be sent to the mixer 35. In the mixer, the box data indicative signal from the box data generator 40 is superimposed on the composite signal from the encoder 34. The output of the mixer 35 is fed to the display monitor 10 through the gate 36 and the amplifier 37. Therefore, the video image corresponding to the image on the photofilm is displayed on the display monitor 10 with a trimming box superimposed thereon.

As set forth, the size and shape of the trimming frame is controlled by the aforementioned rotary selector members and/or the push button members.

On the other hand, when the trimming mask is selected through the rotary selector member 11b, the masking data generator 41 becomes active. At the same time, the box data generator 40 is inactivated. The masking data generator 41 is responsive to a masking control signal from the system controller 39 to control the gate 36. The system controller 39 derives the masking control signal based on the signals from the frame configuration push-button selector members 12a to 12e and from the rotary selector members 11a, 13a and 13b. The output of the masking data generator 41 monitors the time base or axis of the composite signal from the encoder 34 and closes the gate over periods of time corresponding to the section or sections of the video image to be masked. Thus, the trimming mask and the video image of the finished print are reproduced on the display.

It should be appreciated that manual operation of the input unit in the free-size mode can produce not only the foregoing square or rectangular trimming masks but also other configurations, such as hearts.

Furthermore, it is also possible to allow more control over the nature of the border between the trimming image and the frame, if so desired.

As set forth previously, the trimming instructions, such as date, presence or absence of a white margin, glossy or matte finish, frame number, and so forth, can be entered through the ten-key array 15. The system controller 39 is responsive to input through the ten-key pad to activate the instruction data signal generator 43. The instruction data signal generator 43 cooperates with the position data generator 42. The instruction data signal generator in responsive to the instruction data indicative output from the system controller 39 to generate instruction data signals representative of the individual trimming instructions mentioned above. The position data generator 42 is also connected to the system controller 39 to receive therefrom the position control signal specific to each type of trimming instruction data. The position data generator 42 receives the instruction data signals from the instruction data generator 43 to derive a trimming instruction display control signal indicative of the trimming instruction data and display position thereof.

The instruction data generator 43 converts the instruction code, such as BCD code, from the system controller 39 into the alphanumeric characters for display of the trimming instructions on the display monitor 10.

The trimming instruction display control signal from the position data generator 42 is fed to the mixer 35. In the mixer, the trimming instruciton display control signal is superimposed on the composite signal from the encoder 34 and then fed to the display monitor 10.

The system controller 39 is also connected to a zoom control lever 30 as set forth above. The system controller 39 is responsive to a position signal from the zoom control lever 30 to derive a zoom control signal to be fed to a zoom drive circuit 44. The zoom drive circuit 44 is responsive to the zoom control signal from the system controller to feed a drive signal to the zoom servo-motor 7b. The driver signal from the zoom drive circuit 44 orders the zoom servo-motor 7b to move the lens 7 to a desired position so as to obtain a desired image size.

Furthermore, the system controller 39 is responsive to a negative/positive selector signal from the rotary selector member 11b to derive a reversal control signal. The reversal control signal is fed to the reversal processing circuit 33 associated with the image processor. The reversal processing circuit 33 derives an output signal to be fed to the image processor for color phase reversal or negative/positive reversal in a per se well-known manner.

The printer 38 is connected to the output of the amplifier 37 through a print signal generator 45. The printer 38 is also connected to the system controller 39 to receive therefrom a printer control signal. Therefore, the printer 38 becomes active in response to the printer control signal from the system controller 39, which printer control signal is produced in response to manual operation of the operation buttons 19 of the input unit.

The print signal generator 45 includes a memory (not shown) for storing one field or one frame of video image data corresponding to that to be displayed on the display monitor. Based on the content of the memory, the print signal generator 45 outputs a print data indicative signal representative of the video image displayed on the display monitor 10.

Therefore, according to the present invention, trimming instructions in the form of a print of the photo-image with the added image of a trimming mask or box and additional alphanumerical instructions can be conveniently obtained. This hard copy of trimming instructions will make the instructor's or customer's desires clear and so make the developer's trimming operation easier and more accurate.

Figure 9:
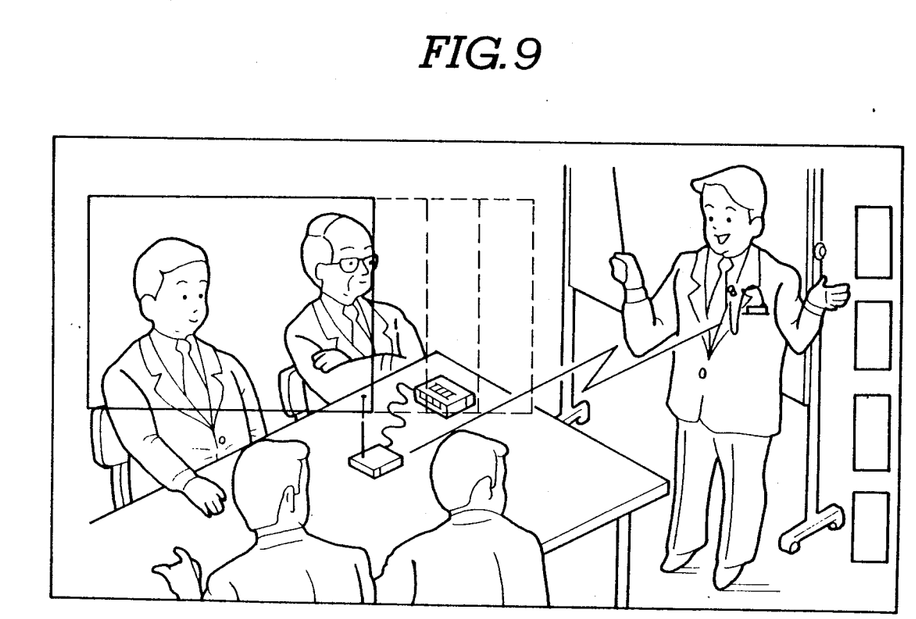
FIG. 9 is an enlargement of FIG. 5 showing a different caption lay-out.

It should be appreciated that, although the shown embodiment employs a thermal printer for printing the photo-image, it would be possible to use any type or kind of printer. For example, an electrostatic copier, ink-jet printer or the like could be used as the printer, if desired. Also, the captions for the alphanumeric trimming instructions need not be positioned as shown in FIG. 1. For instance, as shown in FIG. 9, the captions can be laid out along one vertical edge of the print. If desired, it would be possible to allow the operator to select the caption positions.

As set forth above, the present invention should not be taken to be limited to the specific embodiment set out hereabove, but should be appreciated to include all possible embodiments and modifications of the embodiments which can be implemented without departing from the principles of the invention set out in the appended claims.

What is claimed is:

1. An apparatus for printing trimming instructions for use in trimming a photograph, comprising:
   first means for picking up images from photofilm and generating a video signal based thereon;
   second means for displaying a video image on a display screen, which video image corresponds to the image on said photofilm;
   third means for drawing a frame delimiting a section of the image to be trimmed on said display screen; and
   fourth means for printing a copy of the image on said display screen.

2. An apparatus as set forth in claim 1, wherein said third means allows adjustment of the size and shape of said frame.

3. An apparatus as set forth in claim 2, wherein said third means includes a manual operation unit allowing manual selection of the size and shape of said frame.

4. An apparatus as set forth in claim 3, wherein said manual operation unit includes a plurality of selector switches for selecting the shape of said frame among a plurality of known standard horizontal/vertical proportions.

5. An apparatus as set forth in claim 3, wherein said manual operation unit allows input of alphanumeric characters providing additional instructions for trimming in addition to said frame.

6. An apparatus as set forth in claim 3, wherein said first means performs negative/positive reversal of the image on said display screen.

7. An apparatus as set forth in claim 3, wherein said first means includes a zoom mechanism for adjusting the size of the video image reproduced on said display screen.

8. A process for printing trimming instructions for use in trimming and development of a photograph, comprising the steps of:
   picking up an image of a base photofilm;
   generating a video signal indicative of the picked up image;
   reproducing said video signal on a display screen;
   drawing a frame delimiting an area of the reproduced image to be trimmed; and printing a copy of said reproduced image and said frame for reference during trimming and development of said base photofilm.

9. A process as set forth in claim 8, which further comprises a step for selecting the size and shape of said frame.

10. A process as set forth in claim 9, which further comprises a step of selecting the type of frame from between a box and a mask.

11. A process as set forth in claim 9, which further comprises a step of inputting additional alphanumeric characters providing additional instructions and information necessary for trimming, and a step of superimposing said additional alphanumeric characters on said reproduced image on said display screen.

12. A process as set forth in claim 9, wherein said step for selecting the size and shape of said frame includes selection of the horizontal/vertical aspect ratio from among a plurality of known standard values.

13. A process as set forth in claim 9, which further comprises a step of inputting additional alphanumeric characters providing additional instructions and information necessary for trimming, and a step of superimposing said additional alphanumeric characters on said copy.

14. An apparatus for printing trimming instructions for use in developing and trimming photographs, comprising:
- means for displaying an image recorded in a photograph;
- means allowing manual specification of a trimming frame and for superimposing an image of said trimming frame on said displayed image to form a trimming instruction image; and
- means for reproducing said trimming instruction image in a form suitable for transfer to a photographic developer.

* * * * *